US010742642B2

(12) United States Patent
Avni et al.

(10) Patent No.: US 10,742,642 B2
(45) Date of Patent: Aug. 11, 2020

(54) USER AUTHENTICATION BASED ON PREDICTIVE APPLICATIONS

(71) Applicant: International Business Machines Corporation, Armonk, NY (US)

(72) Inventors: Ayelet Avni, Binyamina (IL); Fady Copty, Nazareth (IL); Ayman Jarrous, Shafa-amer (IL); Sharon Keidar-Barner, Megiddo (IL); Shiri Lemel, Tel-Aviv (IL)

(73) Assignee: International Business Machines Corporation, Armonk, NY (US)

(*) Notice: Subject to any disclaimer, the term of this patent is extended or adjusted under 35 U.S.C. 154(b) by 105 days.

(21) Appl. No.: 16/170,210

(22) Filed: Oct. 25, 2018

(65) Prior Publication Data

US 2019/0132306 A1    May 2, 2019

Related U.S. Application Data

(63) Continuation-in-part of application No. 15/371,241, filed on Dec. 7, 2016, now Pat. No. 10,380,590.

(51) Int. Cl.
*G06N 20/00* (2019.01)
*H04L 29/06* (2006.01)
(Continued)

(52) U.S. Cl.
CPC .......... *H04L 63/083* (2013.01); *G06F 21/316* (2013.01); *G06N 20/00* (2019.01);
(Continued)

(58) Field of Classification Search
CPC .......................... G06N 20/00; G06Q 30/0277
See application file for complete search history.

(56) References Cited

U.S. PATENT DOCUMENTS 8,370,280 B1 * 2/2013 Lin .................... G06N 20/00
706/12
8,918,479 B2   12/2014 O'Connell et al.
(Continued)

FOREIGN PATENT DOCUMENTS

WO    WO-2017218216 A1 * 12/2017 ............. G06Q 30/00
WO    WO-2018154482 A1 *  8/2018 ......... G06F 16/9537

OTHER PUBLICATIONS

Ibrahim, Anas, "A Hybrid-based Filtering Approach for User Authentication", Apr. 1, 2017, IEEE Conferences—2017 IEEE 30th Canadian Conference on Electrical and Computer Engineering, p. 1-5 (Year: 2017).*

(Continued)

*Primary Examiner* — Abhishek Vyas
*Assistant Examiner* — Abdulmajeed Aziz

(57) ABSTRACT

In some examples, a system for authenticating users can include a processor to train a first predictive application based on a first set of user engagements with advertisements, wherein the first predictive application is associated with a first advertising identifier. The processor can also train a second predictive application based on a second set of user engagements with the advertisements, wherein the second predictive application is associated with a second advertising identifier. Additionally, the processor can compare the first predictive application and the second predictive application and authenticate a user in response to detecting a similarity of the first predictive application and the second predictive application is below a threshold value, wherein authenticating the user enables the user to access a resource or service.

5 Claims, 9 Drawing Sheets

(51) Int. Cl.
  G06Q 20/40 (2012.01)
  G06Q 30/02 (2012.01)
  G06F 21/31 (2013.01)
(52) U.S. Cl.
  CPC ......... *G06Q 20/40* (2013.01); *G06Q 30/0241* (2013.01); *H04L 63/102* (2013.01)

(56) References Cited

U.S. PATENT DOCUMENTS

| | | | |
|---|---|---|---|
| 8,918,904 | B2 | 12/2014 | Sanin et al. |
| 9,372,979 | B2 | 6/2016 | Klein |
| 9,374,671 | B1* | 6/2016 | Zhyshko ............... H04W 4/029 |
| 9,642,005 | B2 | 5/2017 | Fosmark et al. |
| 9,858,405 | B2 | 1/2018 | Ranadive et al. |
| 9,860,239 | B2 | 1/2018 | Stubblefield |
| 9,865,005 | B1* | 1/2018 | Pottjegort .......... G06Q 30/0246 |
| 9,936,044 | B2 | 4/2018 | Allinson et al. |
| 2008/0220760 | A1* | 9/2008 | Ullah .................... G06Q 30/02 455/420 |
| 2012/0089996 | A1* | 4/2012 | Ramer .................. H04H 60/46 725/14 |
| 2014/0214670 | A1 | 7/2014 | McKenna |
| 2014/0289867 | A1* | 9/2014 | Bukai ................ G06Q 20/4016 726/28 |
| 2015/0269577 | A1 | 9/2015 | Avegliano et al. |
| 2015/0278504 | A1 | 10/2015 | Azim et al. |
| 2015/0363581 | A1* | 12/2015 | Ranadive ................ G06F 21/34 726/19 |
| 2016/0189153 | A1 | 6/2016 | Luk et al. |
| 2016/0350815 | A1* | 12/2016 | Qiu .................... G06Q 30/0248 |
| 2017/0169431 | A1 | 6/2017 | Groarke et al. |
| 2017/0213200 | A1 | 7/2017 | Purves |
| 2017/0316450 | A1* | 11/2017 | Kobylkin ........... G06Q 30/0277 |
| 2018/0047065 | A1* | 2/2018 | Wildberger ............. H04L 67/22 |

OTHER PUBLICATIONS

Nag, Abhijit Kumar, "An Adaptive Approach for Continuous Multi-Factor Authentication in an Identity Ecosystem", 2014 in CISR. (Year: 2014).*

Nag, Abhijit Kumar, et al., "An Adaptive Approach for Continuous Multi-Factor Authentication in an Identity Eco-System," Published 2014 in CISR, Abstract only (1 page).

* cited by examiner

USER AUTHENTICATION BASED ON PREDICTIVE APPLICATIONS

BACKGROUND

The present disclosure relates to user and transaction authentication, and more specifically, but not exclusively, to authenticating users based on predictive applications.

SUMMARY

According to an embodiment described herein, a system for authenticating users can include a processor to train a first predictive application based on a first set of user engagements with advertisements, wherein the first predictive application is associated with a first advertising identifier. The processor can also train a second predictive application based on a second set of user engagements with the advertisements, wherein the second predictive application is associated with a second advertising identifier. Additionally, the processor can compare the first predictive application and the second predictive application and authenticate a user in response to detecting a similarity of the first predictive application and the second predictive application is below a threshold value, wherein authenticating the user enables the user to access a resource or service.

According to another embodiment, a method for authenticating users can include training, via a processor, a first predictive application based on a first set of user engagements with advertisements, wherein the first predictive application is associated with a first advertising identifier. The method can also include training, via the processor, a second predictive application based on a second set of user engagements with the advertisements, wherein the second predictive application is associated with a second advertising identifier. Additionally, the method can include comparing the first predictive application and the second predictive application and authenticating a user in response to detecting a similarity of the first predictive application and the second predictive application is below a threshold value, wherein authenticating the user enables the user to access a resource or service.

According to another embodiment, a computer program product for authenticating users can include a computer readable storage medium having program instructions embodied therewith, wherein the computer readable storage medium is not a transitory signal per se. The program instructions can be executable by a processor to cause the processor to train a first predictive application based on a first set of user engagements with advertisements, wherein the first predictive application is associated with a first advertising identifier. The program instructions can also cause the processor to train a second predictive application based on a second set of user engagements with the advertisements, wherein the second predictive application is associated with a second advertising identifier. Additionally, the program instructions can also cause the processor to compare the first predictive application and the second predictive application and authenticate a user in response to detecting a similarity of the first predictive application and the second predictive application is below a threshold value, wherein authenticating the user enables the user to access a resource or service.

DETAILED DESCRIPTION

Figure 1:
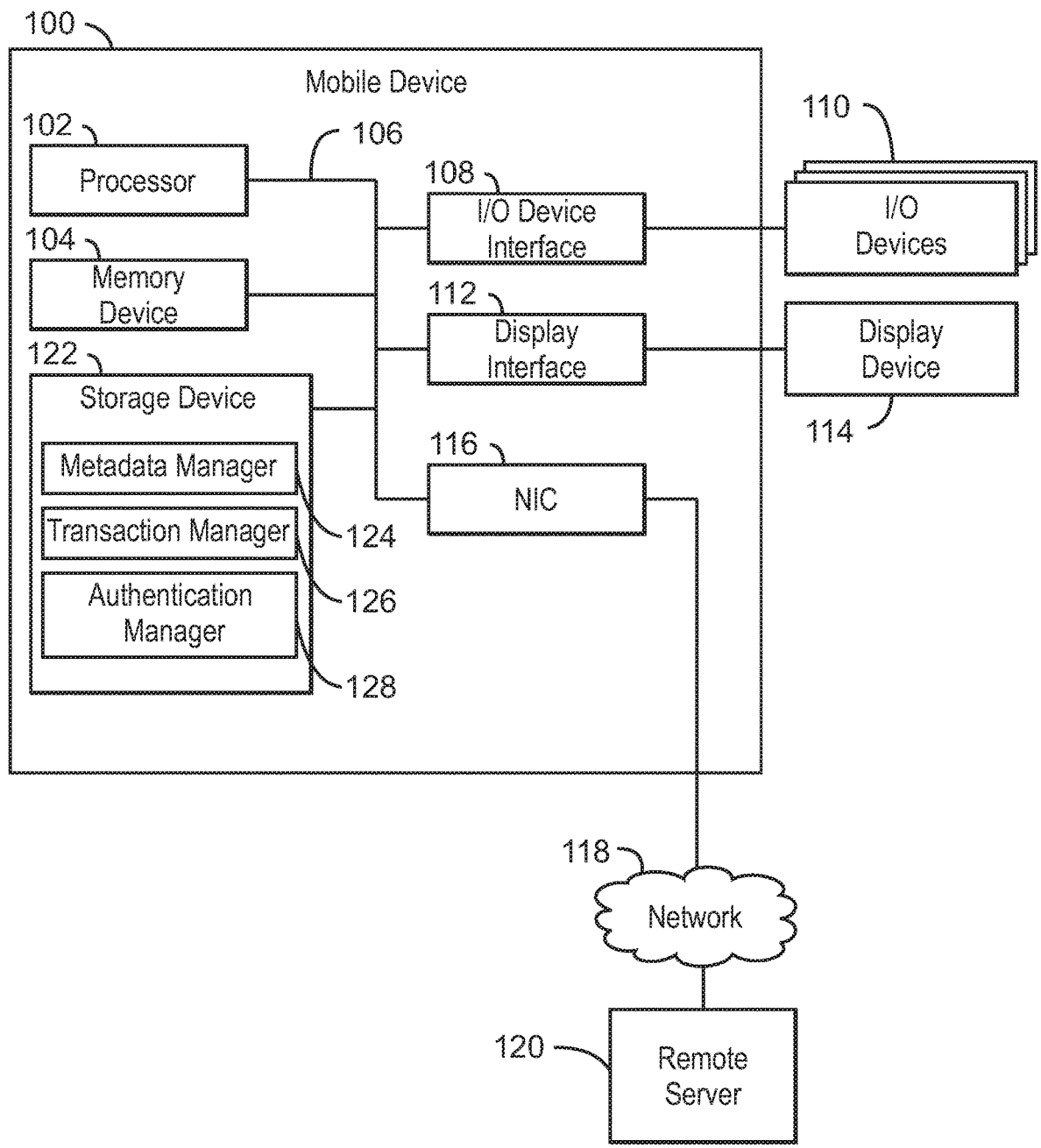
FIG. 1 depicts a block diagram of an example computing system that can authenticate transactions according to an embodiment described herein.

Mobile computing devices can include any number of sensors that collect data regarding the environment of the mobile computing devices. For example, mobile computing devices can include global positioning system (GPS) sensors, accelerometers, gyrometers, compasses, and the like. In some examples, the mobile computing devices can store sensor data from the sensors to improve application functionality and enable remote services that are executed based on the sensor data.

In some examples, the sensor data from the mobile devices can be used to authenticate transactions provided by a remote service provider. For example, a remote service provider may provide product related services, financial related services and the like. The remote service provider can attempt to authenticate a transaction for a remote service based on information stored on a mobile device. For example, a remote service provider can transmit the transaction and any other suitable information corresponding to the transaction to a remote server in a data center. The remote server can then transmit information corresponding to the transaction to a mobile device associated with the transaction. The remote service provider may rely on authentication information from a mobile device associated with a user initiating a transaction.

The embodiments described herein include techniques for authenticating transactions. In some examples, a device can detect metadata corresponding to a user of a mobile device, wherein the metadata comprises a call history from the mobile device. The device can also detect transaction information corresponding to the user of the mobile device from a remote server, wherein the transaction information corresponds to a transaction initiated at a remote service provider and wherein the transaction information indicates a transaction type and transaction initiator information. Additionally, the device can generate an authentication score of the transaction based on the metadata and the transaction information. The device can then authorize the transaction based on the authentication score or send the authentication score to a remote device to enable the remote device to authorize the transaction. In some examples, the device can also send additional metrics to the remote device. In some embodiments, the additional metrics can include GPS information, a call history, and the like, which can enable a remote server to perform an investigation and forensics analysis. In some examples, the device can implement consent management, where the additional metrics may be transmitted for certain purposes, and can be usable for a certain period of time. Sending such data to a remote server may be done with the consent of the user in an online manner or in an offline manner, where the user may opt-in to send such information.

The techniques described herein can reduce a number of unauthorized transactions performed by a remote service provider. Furthermore, the techniques described herein can prevent unauthorized access of metadata and other information from a mobile device by evaluating or authenticating a transaction locally on the mobile device without transmitting the metadata or other information to a remote server.

With reference now to FIG. 1, an example computing device is depicted that can authenticate transactions. The mobile computing device 100 may be for example, a server, desktop computer, laptop computer, tablet computer, or smartphone. In some examples, mobile computing device 100 may be a cloud computing node. Mobile computing device 100 may be described in the general context of computer system executable instructions, such as program modules, being executed by a computer system. Generally, program modules may include routines, programs, objects, components, logic, data structures, and so on that perform particular tasks or implement particular abstract data types. Mobile computing device 100 may be practiced in distributed cloud computing environments where tasks are performed by remote processing devices that are linked through a communications network. In a distributed cloud computing environment, program modules may be located in both local and remote computer system storage media including memory storage devices.

The mobile computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the mobile computing device 100 to one or more I/O devices 110. The I/O devices 110 may include, for example, a keyboard and a pointing device, wherein the pointing device may include a touchpad or a touchscreen, among others. The I/O devices 110 may be built-in components of the mobile computing device 100, or may be devices that are externally connected to the mobile computing device 100.

The processor 102 may also be linked through the system interconnect 106 to a display interface 112 adapted to connect the mobile computing device 100 to a display device 114. The display device 114 may include a display screen that is a built-in component of the mobile computing device 100. The display device 114 may also include a computer monitor, television, or projector, among others, that is externally connected to the mobile computing device 100. In addition, a network interface controller (NIC) 116 may be adapted to connect the mobile computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the mobile computing device 100 through the network 118. In some examples, the remote server 120 can send an authentication request for a transaction to the mobile computing device 100.

The processor 102 may also be linked through the system interconnect 106 to a storage device 122 that can include a hard drive, an optical drive, a USB flash drive, an array of drives, or any combinations thereof. In some examples, the storage device 122 may include a metadata manager 124 that can detect metadata corresponding to a user of a mobile device, wherein the metadata comprises a call history from the mobile device. The metadata can also include additional information such as a browsing history for a user of a mobile device, location history for a mobile device, sensor data from the mobile device, data from communications initiated from other programs or applications on the mobile device, and the like. For example, the metadata can include data corresponding to applications that interface with online marketplaces, social networking applications, and texting applications, among others. In some embodiments, a transaction manager 126 can detect transaction information corresponding to the user of the mobile device from a remote server, wherein the transaction information corresponds to a transaction initiated at a remote service provider. In some examples, the transaction information also indicates a transaction type and transaction initiator information. For example, a transaction type can indicate that a transaction is related to a point of sale transaction, a product related service, or a financial service, among others. The transaction initiator information can indicate a location associated with the remote service provider, a time of the transaction, and any other information about the remote service provider.

Additionally, in some embodiments, an authentication manager 128 can generate an authentication score of the transaction based on the metadata and the transaction information. The authentication score can indicate likelihood that the transaction initiated at the remote service provider was authorized based on a combination of the transaction information and the metadata from the mobile device, which corresponds to the user associated with the transaction. The authentication manager 128 can also authorize the transaction based on the authentication score. For example, the authentication manager 128 can send the authentication score to a remote server, wherein the remote server can determine if the authentication score exceeds a threshold indicating the transaction is authorized. The authentication manager 128 can also send an authentication response to a remote server indicating if the transaction is authorized or unauthorized.

It is to be understood that the block diagram of FIG. 1 is not intended to indicate that the mobile computing device 100 is to include all of the components shown in FIG. 1. Rather, the mobile computing device 100 can include fewer or additional components not illustrated in FIG. 1 (e.g., additional memory components, embedded controllers, modules, additional network interfaces, etc.). Furthermore, any of the functionalities of the metadata manager 124, the transaction manager 126, and the authentication manager 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the metadata manager 124, the transaction manager 126, and the authentication manager 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
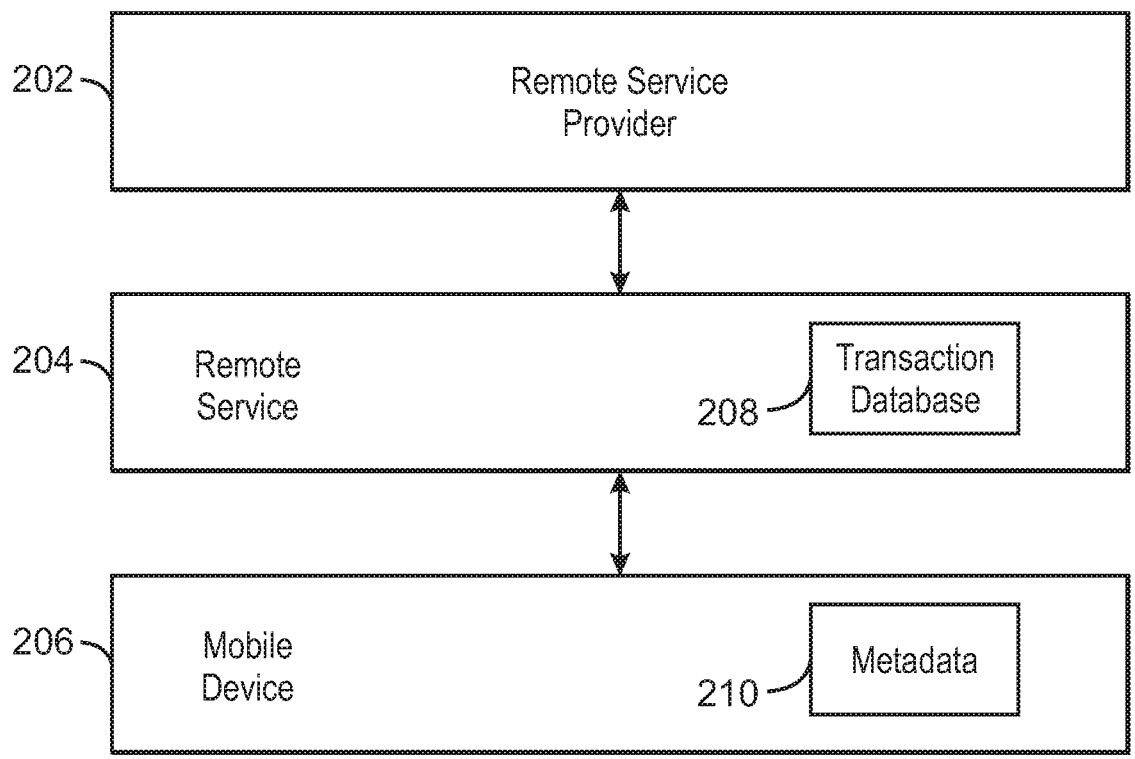
FIG. 2 is a block diagram of a system for authenticating transactions.

FIG. 2 is a block diagram illustrating an example system for authenticating transactions. The system can include a remote service provider 202, a remote server 204, and a mobile device 206. In some embodiments, the remote service provider 202 can detect an initiation of a transaction and send a transaction type along with transaction initiator information to the remove server 204. As discussed above, a transaction type can indicate that a transaction is related to a point of sale transaction, a product related transaction, or a financial related transaction, among others. The transaction initiator information can indicate a location associated with the remote service provider 202, a time of the transaction, and any other information about the remote service provider 202. In some embodiments, the remote service provider 202 can send the transaction to the remote server 204 and the remote server 204 can identify a transaction type.

In some embodiments, the remote server 204 can include a transaction database 208 or any other suitable memory component that stores user information. The remote server 204 can query the transaction database 208 to determine a user and mobile device associated with the transaction. For example, the remote server 204 can detect that information provided to the remote service provider 202, such as a credit card number or any other suitable information, is associated with a user and the user's mobile device. The remote server 204 can then transmit transaction information to the mobile device 206. For example, the remote server 204 can transmit the transaction type and transaction initiator information to the mobile device 206.

In some embodiments, the mobile device 206 can detect metadata 210 corresponding to a user of a mobile device. The metadata 210 can include a call history, browsing history, sensor data, and location history, among others. The mobile device 206 can also detect the transaction information corresponding to the user of the mobile device from the remote server 204. Additionally, the mobile device 206 can generate an authentication score of the transaction based on the metadata 210 and the transaction information. The mobile device 206 can also authorize the transaction based on the authentication score. For example, the mobile device 206 can send the authentication score to the remote server 204 or send an authentication response to the remote server indicating whether the transaction is to be approved. The techniques described herein can prevent unauthorized access of metadata 210, sensor data, and other information from a mobile device 206 by authenticating a transaction locally on the mobile device 206 without transmitting the metadata 210 or other information to the remote server 204.

In some examples, the mobile device 206 can authenticate a transaction in which a card is not presented to the remote service provider 202. For example, a monitor application stored on the mobile device 206 can browse a mobile call history. If the mobile device 206 recently communicated with the remote service provider 202, the transaction can be authenticated with a higher probability or authentication score.

In some examples, the mobile device 206 can authenticate a transaction in which a card is not presented to the remote service provider 202 based on a browsing history of the remote service provider. For example, the remote service provider 202 can transmit a portion of the browsing history of its web store to the mobile device 206. If the mobile device 206 detects that a user of the mobile device 206 recently browsed the web store of the remote service provider 202 based on user credentials, internet protocol address of the mobile device 206, or any other identification method, then the transaction can be authenticated with a higher probability or authentication score.

In some examples, the mobile device 206 can authenticate a transaction with or without a card being presented to a remote service provider 202. For example, if a user of the mobile device 206 has a history of connections with a similar type of remote service provider, the transaction can be authenticated with a higher probability. For example, the mobile device 206 can detect that a transaction corresponds to a type of product such as computer hardware, among others. The mobile device 206 may detect that a user of the mobile device has communicated with a number of remote service providers regarding computer hardware within a period of time. The mobile device 206 can then provide a higher authentication score.

In some examples, the mobile device 206 can authenticate a transaction in which a card is not presented to a remote service provider 202. For example, a monitor application of the mobile device 206 can browse or monitor a user's mobile activity, browsing history, interests, social networks activity, and the like. The authentication score can incorporate the monitored information to increase the accuracy of authorizing the transaction. For example, the mobile device 206 can increase an authentication score if a transaction is for a type of product that corresponds to searches in a browsing history or social network for products of the same type.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional memory components, modules, additional network interfaces, etc.).

Figure 3:
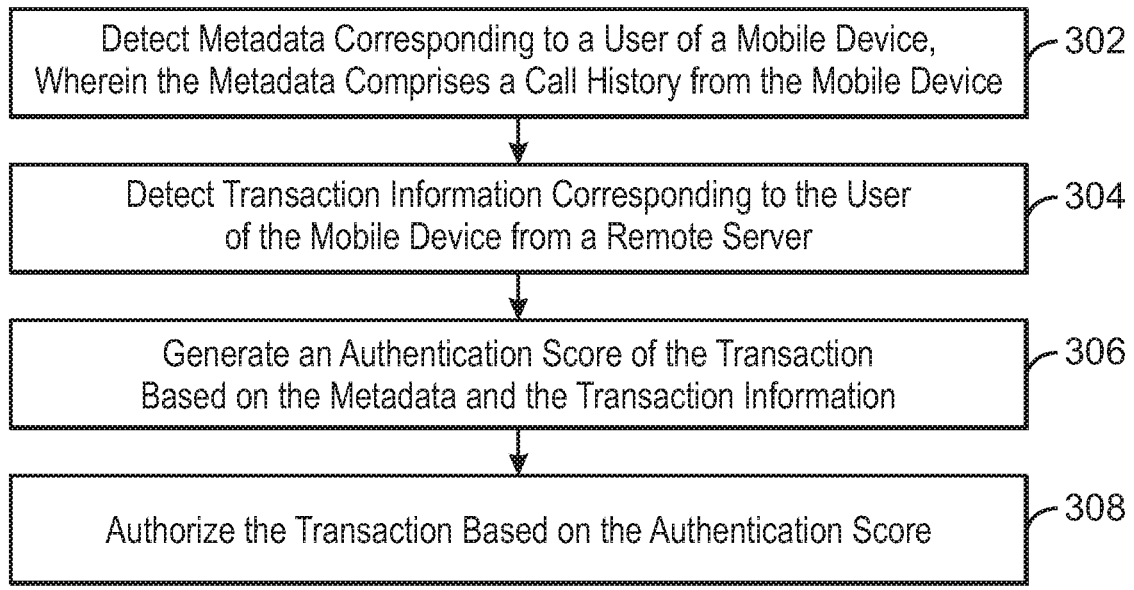
FIG. 3 is a process flow diagram of an example method that can authenticate transactions according to an embodiment described herein.

FIG. 3 is a process flow diagram of an example method that can authenticate transactions. The method 300 can be implemented with any suitable computing device, such as the computing device 100 of FIG. 1.

At block 302, a metadata manager 124 can detect metadata corresponding to a user of a mobile device, wherein the metadata comprises a call history from the mobile device. A call history, as referred to herein, can indicate any suitable number of phone numbers called from a mobile device, any number of phone numbers from which the mobile device received a call. In some embodiments, the call history can be based on any suitable period of time. For example, a call history can be based on a previous day, week, month, or any other suitable time period. In some embodiments, the call history can include a timestamp associated with each call. In some examples, the call history can also include text messages received by the mobile device or sent to other devices.

In some embodiments, the metadata further includes a browsing history and a location history. The browsing history can indicate any number of web pages and web applications that a mobile device has accessed within a period of time. In some examples, the metadata can also include data from communications initiated from other programs or applications on the mobile device, and the like. For example, the metadata can include data corresponding to applications that interface with online marketplaces, among others. In some embodiments, the metadata can be stored locally by a monitoring application on a mobile device or retrieved from an operating system of the mobile device in response to a query for the metadata. In some embodiments, the metadata manager 124 can detect the metadata from a global positioning system sensor, an accelerometer, a gyrometer, a compass, or any combination thereof. For example, the metadata manager 124 can store any number of locations of a mobile device within a period of time to determine an area in which the mobile device is in use.

At block 304, a transaction manager 126 can detect transaction information corresponding to the user of the mobile device from a remote server, wherein the transaction information corresponds to a transaction initiated at a remote service provider. The transaction information can also indicate a transaction type and transaction initiator information. In some embodiments, the transaction initiator information can include a phone number of the remote service provider, an internet protocol address of the remote service provider, a uniform resource location associated with the remote service provider, a location of the remote service provider, or any combination thereof. In some embodiments, the transaction type can include a financial based service or a product based service, among others. For example, a product based service can include purchasing a product at a point of sale device and the financial based service can include a banking transaction, among others.

At block 306, an authentication manager 128 can generate an authentication score of the transaction based on the metadata and the transaction information. In some examples, the authentication score can be generated using any suitable machine learning technique such as neural networks, or any other artificial intelligence techniques. The authentication score can indicate whether a distance between a mobile device and the remote service provider is below a threshold, whether the remote service provider is located within a perimeter established by previous GPS coordinates of the mobile device, or that a similarity between the transaction and a browsing history of the mobile device exceeds a threshold. In some embodiments, a higher authentication score can indicate an increased likelihood that the transaction is authorized. The authentication manager 128 can increase the authentication score in response to detecting that the mobile device previously called or transmitted an electronic form of communication to the remote service provider. The authentication manager 128 can also increase the authentication score in response to detecting that the mobile device accessed an internet protocol address or uniform resource locator associated with the remote service provider.

In some embodiments, the authentication manager 128 can modify the authentication score based on transaction type. For example, the authentication manager 128 can modify the authentication score to indicate the transaction is authorized in response to detecting that a banking or financial related transaction is from a remote service provider within a predetermined distance of the mobile device. In some examples, the authentication manager 128 can modify the authentication score for a product related service based on detecting that a remote service provider is within a predetermined distance of the mobile device or that the remote service provider is within a perimeter of GPS locations of the mobile device based on a period of time. The authentication manager 128 can also modify the authentication score in response to detecting that the remote service provider is outside a predetermined distance from the mobile device, but the mobile device has called the remote service provider, sent an electronic communication to the remote service provider, or viewed a web site corresponding to the remote service provider within a period of time. In some embodiments, the authentication manager 128 can detect a sleep schedule of a user based on a period of inactivity for a number of consecutive days. The authentication manager 128 can increase or decrease the authentication score based on whether the transaction occurred during a period of inactivity of the mobile device. For example, the authentication manager 128 can detect that a transaction has occurred during a period of inactivity of a mobile device and determine that the transaction is likely unauthorized. In some examples, the authentication manager 128 can then decrease the authentication score based on the likelihood that the transaction is unauthorized. In some examples, the authentication manager 128 can determine whether the inactivity of a mobile device can be used as a contributing factor to the authentication score. In some embodiments, the authentication manager 128 can use any suitable scale to indicate whether a transaction is authorized. For example, a lower authentication score can indicate that a transaction is authorized and the authentication manager 128 can decrease the authentication score based on transaction information or metadata indicating that the transaction is authorized.

At block 308, the authentication manager 128 can authorize the transaction based on the authentication score. In some embodiments, the authentication manager 128 can authorize the transaction by transmitting the authentication score to the remote server. The remote server may store predetermined thresholds regarding whether an authentication score indicates that the transaction is to be approved. In some examples, the authentication manager 128 can provide an authentication response to the remote server. For example, the authentication response can include an approval or a rejection of the transaction. In some embodiments, the authentication manager 128 can generate the authentication response based on the transaction type. For example, the authentication manager 128 may approve product related transactions for an amount of money below a threshold amount with a lower authentication score than a financial related transaction associated with a larger amount of money. In some embodiments, the authentication manager 128 can determine authentication scores are to exceed a predetermined value in order to authorize a transaction, wherein the predetermined value can be based on transaction type, time of day, or any other suitable information.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the authentication manager 128 can also indicate to a remote server to request additional authentication information from the user via a text message, a phone call, or a notification. In some examples, the additional authentication information is provided by a mobile device and can be prompted by a remote server. For example, the additional authentication information can indicate that a remote server is to prompt a user of a mobile device to respond to the remote server with an alphanumeric code, select a notification on a mobile device, select a hyperlink provided in an email, and the like. In some embodiments, the remote server can send the additional authentication information to the mobile device and the authentication manager 128 can revise the authentication score based on the additional authentication information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
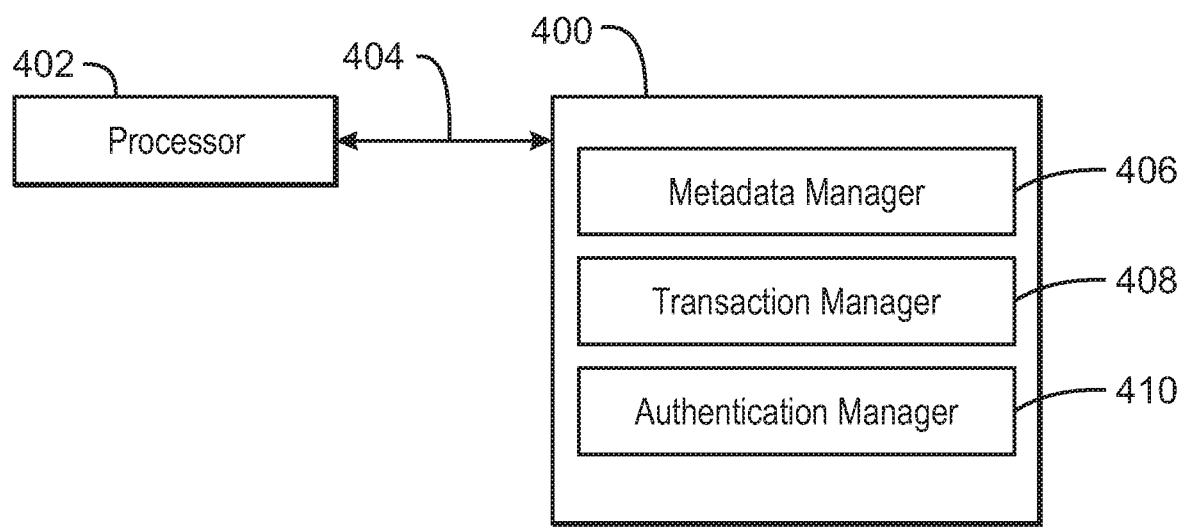
FIG. 4 is a tangible, non-transitory computer-readable medium that can authenticate transactions according to an embodiment described herein.

Referring now to FIG. 4, a block diagram is depicted of an example of a tangible, non-transitory computer-readable medium that can authenticate transactions. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, a metadata manager 406 that can detect metadata corresponding to a user of a mobile device, wherein the metadata comprises a call history from the mobile device. In some embodiments, a transaction manager 408 can detect transaction information corresponding to the user of the mobile device from a remote server, wherein the transaction information corresponds to a transaction initiated at a remote service provider. In some examples, the transaction information also indicates a transaction type and transaction initiator information. Additionally, in some embodiments, an authentication manager 410 can generate an authentication score of the transaction based on the metadata and the transaction information. The authentication manager 410 can also authorize the transaction based on the authentication score.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
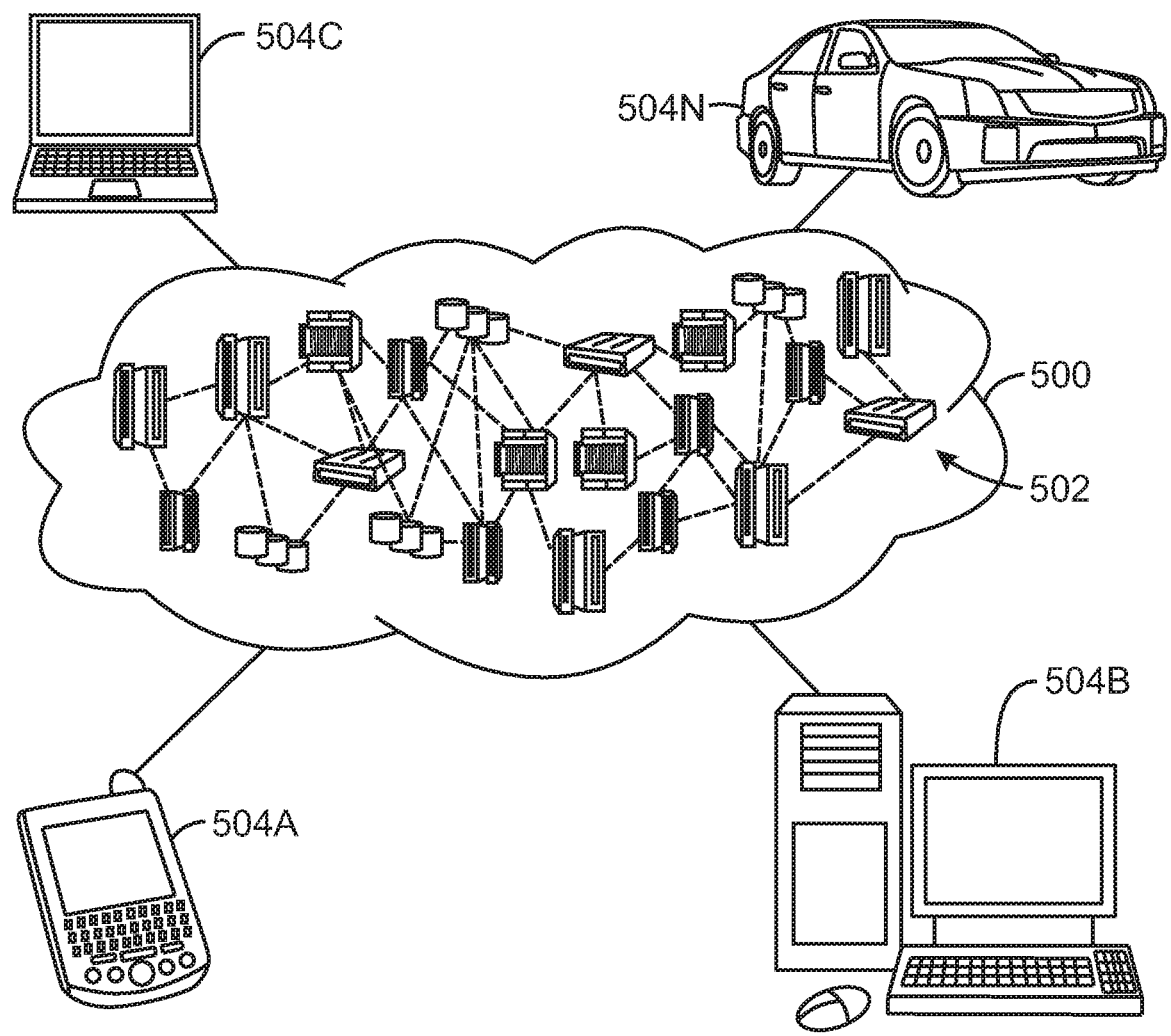
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
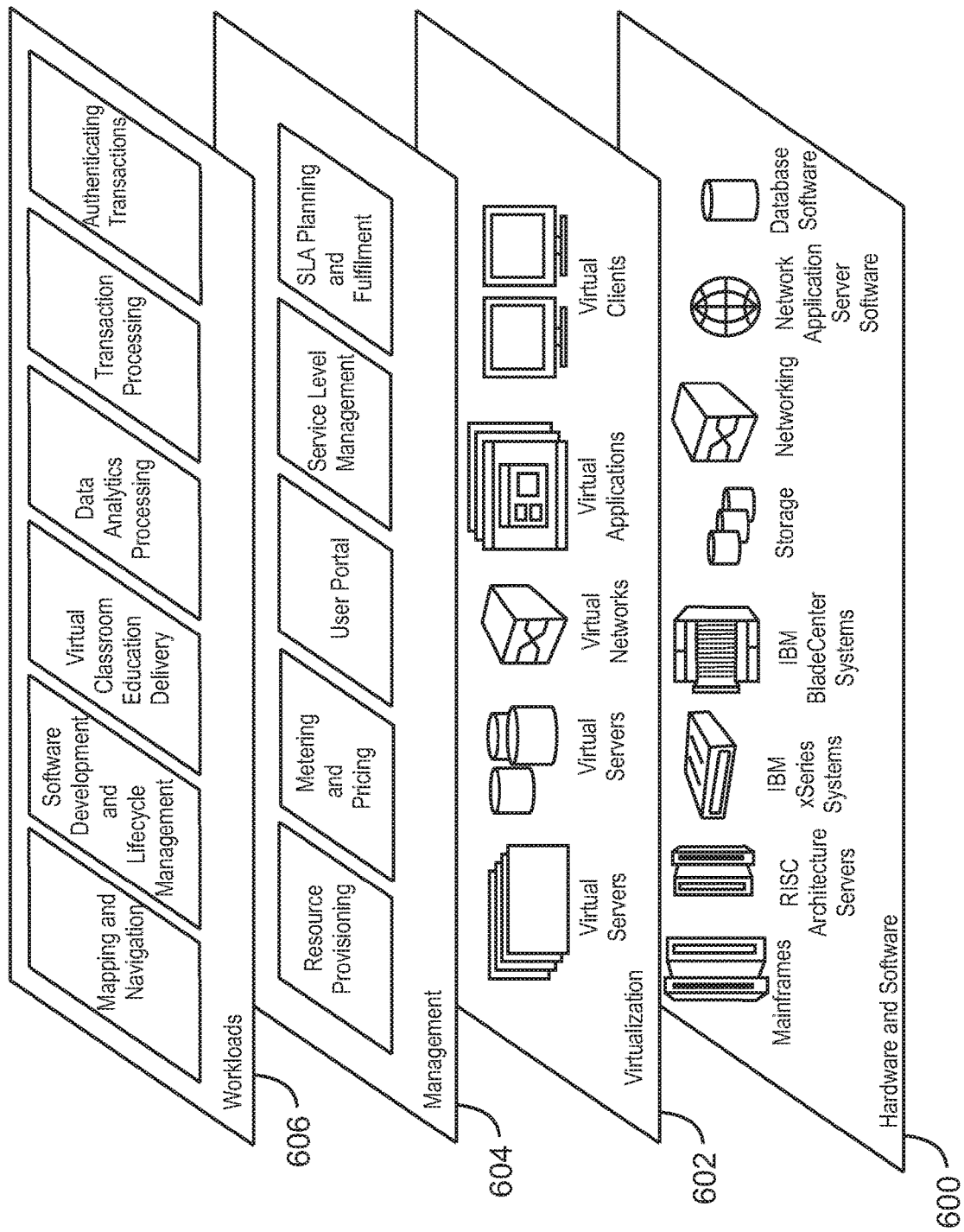
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and authenticating transactions.

In some embodiments described herein, techniques enable authenticating transactions and users. For example, in addition to the authentication of a transaction based on metadata and transaction information, techniques herein can also authenticate a user. In some examples, users are authenticated based on a pattern of user engagements with displayed advertising. For example, a user may interact with displayed advertising in a similar manner on several devices. Accordingly, the user can be further authenticated on the several devices based on the expected or predicted user engagements. For example, a predictive application comprising machine learning techniques can be trained to predict an expected user engagement of a user for a particular advertisement. However, if a user accesses a resource or service on a device and the user engagements do not correspond to the predicted or expected user engagements, a warning can be generated. For example, the warning can indicate that a user's login credentials may be used by unauthorized third parties to gain unauthorized access to a resource or service. As discussed below, determining predicted or expected user engagements with displayed advertising can be based on any number of predictive applications that implement machine learning techniques such as neural networks, decision trees, and the like. Accordingly, the techniques herein can provide a complementary authentication technique that is combined with login credentials and other authentication techniques to enable a device to determine if an unauthorized user has accessed a resource or service.

Figure 7:
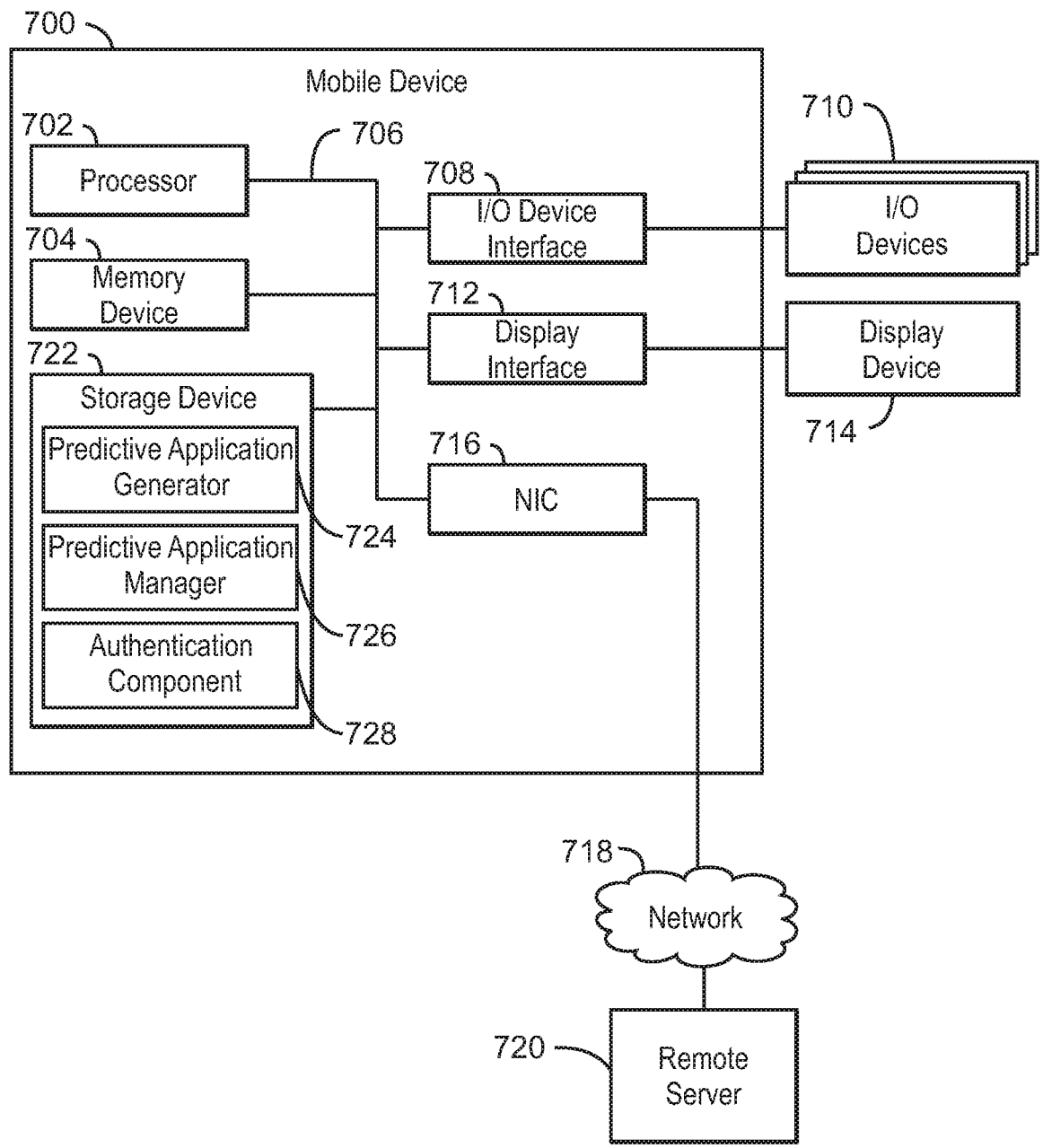
FIG. 7 depicts a block diagram of an example computing system that can authenticate users according to an embodiment described herein.

With reference to FIG. 7, an example computing device is depicted that can authenticate users. The mobile computing device 700 may be for example, a server, desktop computer, laptop computer, tablet computer, or smartphone. In some examples, mobile computing device 700 may be a cloud computing node. Mobile computing device 700 may be described in the general context of computer system executable instructions, such as program modules, being executed by a computer system. Generally, program modules may include routines, programs, objects, components, logic, data structures, and so on that perform particular tasks or implement particular abstract data types. Mobile computing device 700 may be practiced in distributed cloud computing environments where tasks are performed by remote processing devices that are linked through a communications network. In a distributed cloud computing environment, program modules may be located in both local and remote computer system storage media including memory storage devices.

The mobile computing device 700 may include a processor 702 that is adapted to execute stored instructions, a memory device 704 to provide temporary memory space for operations of said instructions during operation. The processor can be a single-core processor, multi-core processor, computing cluster, or any number of other configurations. The memory 704 can include random access memory (RAM), read only memory, flash memory, or any other suitable memory systems.

The processor 702 may be connected through a system interconnect 706 (e.g., PCI®, PCI-Express®, etc.) to an input/output (I/O) device interface 708 adapted to connect the mobile computing device 700 to one or more I/O devices 710. The I/O devices 710 may include, for example, a keyboard and a pointing device, wherein the pointing device may include a touchpad or a touchscreen, among others. The I/O devices 710 may be built-in components of the mobile computing device 700, or may be devices that are externally connected to the mobile computing device 700.

The processor 702 may also be linked through the system interconnect 706 to a display interface 712 adapted to connect the mobile computing device 700 to a display device 714. The display device 714 may include a display screen that is a built-in component of the mobile computing device 700. The display device 714 may also include a computer monitor, television, or projector, among others, that is externally connected to the mobile computing device 700. In addition, a network interface controller (NIC) 716 may be adapted to connect the mobile computing device 700 through the system interconnect 706 to the network 718. In some embodiments, the NIC 716 can transmit data using any suitable interface or protocol, such as the internet small computer system interface, among others. The network 718 may be a cellular network, a radio network, a wide area network (WAN), a local area network (LAN), or the Internet, among others. A remote server 720 may connect to the mobile computing device 700 through the network 718. In some examples, the remote server 720 can send an authentication request for a user to the mobile computing device 700.

The processor 702 may also be linked through the system interconnect 706 to a storage device 722 that can include a hard drive, an optical drive, a USB flash drive, an array of drives, or any combinations thereof. In some examples, the storage device 722 may include a predictive application generator 724 that can detect that a new user is interacting with displayed advertisements. In some embodiments, the predictive application generator 724 can train a first predictive application based on a first set of user engagements with advertisements, wherein the first predictive application is associated with a first advertising identifier. The advertising identifier can be any suitable alphanumeric string that corresponds to a user and/or device. In some embodiments, the predictive application generator 724 can also train a second predictive application based on a second set of user engagements with the advertisements, wherein the second predictive application is associated with a second advertising identifier. For example, the predictive application generator 724 can generate or train a second predictive application in response to the first predictive application being deleted or reset. In some embodiments, the predictive application generator 724 can also generate or train a second predictive application in response to a user interacting with displayed advertising on a separate device, such as a remote device.

In some examples, a predictive application manager 726 can compare the first predictive application and the second predictive application. For example, the predictive application manager 726 can compare feature vectors included in the first predictive application and the second predictive application. Furthermore, an authentication component 728 can authenticate a user in response to detecting a similarity of the first predictive application and the second predictive application is below a threshold value, wherein authenticating the user enables the user to access a resource or service. Alternatively, the authentication component 728 can also generate a warning that the similarity between the first predictive application and the second predictive application exceeds the threshold value. The warning can indicate that an unauthorized user has accessed a resource or service, such as an email account, and has interacted with displayed advertisements in an unexpected manner.

It is to be understood that the block diagram of FIG. 7 is not intended to indicate that the mobile computing device 700 is to include all of the components shown in FIG. 7. Rather, the mobile computing device 700 can include fewer or additional components not illustrated in FIG. 7 (e.g., additional memory components, embedded controllers, modules, additional network interfaces, etc.). Furthermore, any of the functionalities of the predictive application generator 724, predictive application manager 726, and authentication component 728 may be partially, or entirely, implemented in hardware and/or in the processor 702. For example, the functionality may be implemented with an application specific integrated circuit, logic implemented in an embedded controller, or in logic implemented in the processor 702, among others. In some embodiments, the functionalities of the predictive application generator 724, predictive application manager 726, and authentication component 728 can be implemented with logic, wherein the logic, as referred to herein, can include any suitable hardware (e.g., a processor, among others), software (e.g., an application, among others), firmware, or any suitable combination of hardware, software, and firmware.

Figure 8:
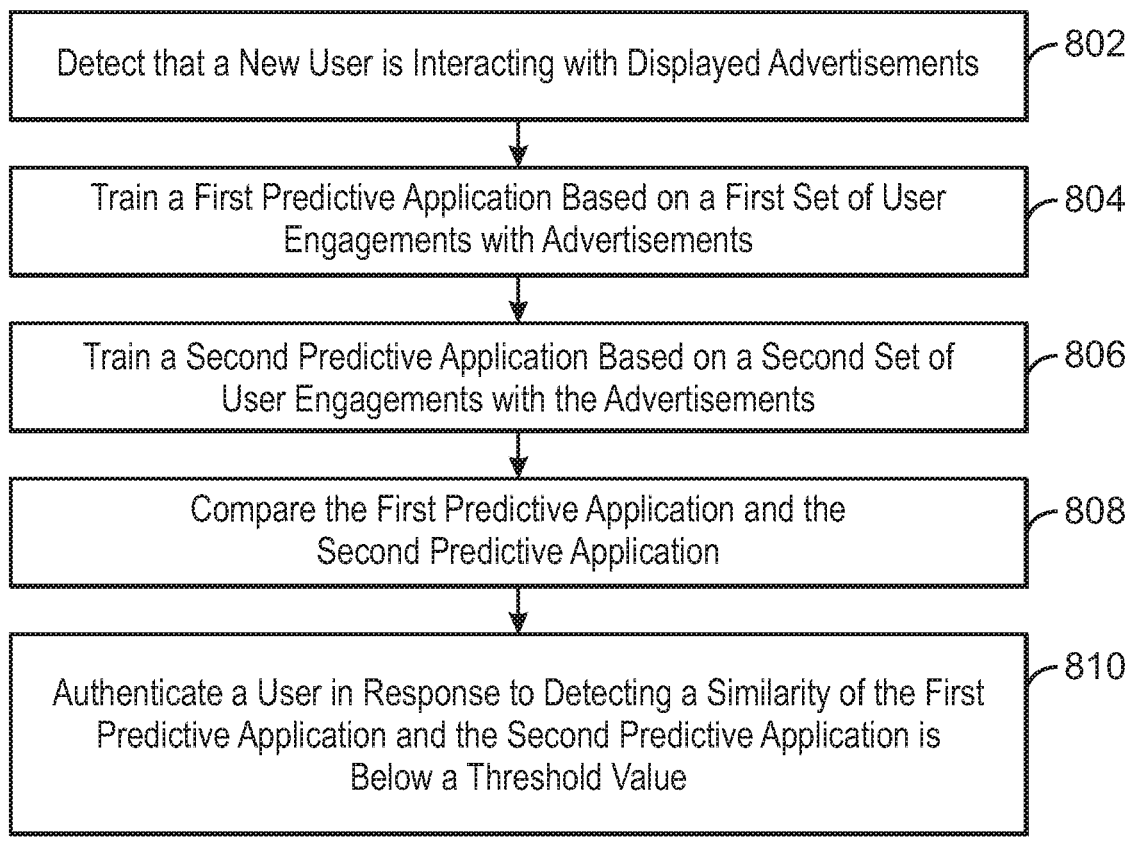
FIG. 8 is a process flow diagram of an example method that can authenticate users according to an embodiment described herein.

FIG. 8 is a block diagram illustrating an example system for authenticating users. The method 800 can be implemented with a mobile computing device 700, a remote server 720, or any combination thereof.

At block 802, a predictive application generator 724 can detect that a new user is interacting with displayed advertisements. The displayed advertising can include advertising pop-up windows, embedded advertising in a webpage, advertising appearing in new browser windows, and the like. In some embodiments, the predictive application generator 724 can detect that the information associated with an advertising identifier has been deleted or that a new advertising identifier has been generated.

At block 804, the predictive application generator 724 can train a first predictive application based on a first set of user engagements with advertisements. The user engagements can include any information related to a user's interactions with displayed advertisements such as an indication that a user has selected a hyperlink within an advertisement, an amount of time a user has viewed the advertisement, a location of the advertisement in a display device, an indication that the advertisement is in vertical or horizontal motion across the display device, an indication that the user has closed the advertisement, a device type the user uses to view the advertisement, a hyperlink or website in which the advertisement is displayed, and the like. In some examples, the first predictive application is associated with a first advertising identifier that corresponds to the user engagements. The first predictive application can implement any suitable machine learning technique such as a neural network, decision tree, and the like. The first predictive application can include a feature vector that stores a set of binary numbers corresponding to the user engagements. For example, the feature vector can include binary numbers representing a time that a user viewed an advertisement, a location of the advertisement in a display device, an indication that the user selected a link corresponding to the advertisement, and indication that the user closed the advertisement, among others.

In some embodiments, the predictive application generator 724 can train the first predictive application for a number of user engagements. After the number of user engagements exceeds a predetermined threshold, the predictive application generator 724 can utilize the first predictive application to determine expected or predicted user engagements associated with the first advertising identifier. In some examples, the number of user engagements used to train the predictive application can vary based on a sampling rate associated with the machine learning technique of the predictive application.

At block 806, the predictive application generator 724 can train a second predictive application based on a second set of user engagements with the advertisements, wherein the second predictive application is associated with a second advertising identifier. In some embodiments, the second predictive application can be trained on the same device as the first predictive application or on a second device. In some examples, the second predictive application is trained in response to the first predictive application being deleted. The second predictive application can include a feature vector based on user engagements corresponding to the second advertising identifier. In some embodiments, the second predictive application can be trained in response to the generation of a new advertising identifier.

At block 808, the predictive application manager 726 can compare the first predictive application and the second predictive application. In some embodiments, the predictive application manager 726 can compare the first predictive application and the second predictive application to calculate a similarity based on a distance metric. In some examples, the distance metric comprises a Euclidean distance, a Manhattan distance, a Minkowski distance, a cosine distance, or a Jaccard distance, among others. For example, the predictive application manager 726 can calculate the distance metric based on the feature vectors for the first predictive application and the second predictive application. In some embodiments, the distance metric can correspond to any suitable feature or set of features in the feature vector. For example, the distance metric can correspond to a value indicating whether a user closed a similar advertisement in the user engagements represented in the feature vector of the first predictive application and the second predictive application or an amount of time that a user viewed an advertisement in the feature vectors first and second predictive applications. In some embodiments, each feature vector can have two or more values corresponding to different user engagements. For example, each feature vector can have a first value indicating a number corresponding to a hyperlink from which the advertisement was viewed and a second value indicating an amount of time a user viewed the advertisement. The predictive application manager 726 can calculate a Euclidean distance based on Equation 1 below, wherein a first feature vector includes values (x1, y1) and a second feature vector includes values (x2, y2).

$$\text{Distance} = \sqrt{(x_2-x_1)^2 + (y_2-y_1)^2} \qquad \text{Eq. 1}$$

At block 810, the authentication component 728 can authenticate a user in response to detecting a similarity of the first predictive application and the second predictive application is below a threshold value, wherein authenticating the user enables the user to access a resource or service. The resource can include a webpage, local or remote storage device, and the like. In some examples, the service can be any suitable remotely hosted application that resides on an external device or a group of external devices.

In some embodiments, the authentication component 728 can detect that the user is unauthorized based on the similarity of the first predictive application and the second predictive application exceeding the threshold value. In some embodiments, the authentication component 728 can prevent the user from accessing the resource or the service in response to detecting that the user is unauthorized. In some embodiments, authenticating the user based on the similarity between the first predictive application and the second predictive application is a complementary authentication technique, and the authentication component 728 can combine the similarity with a username and password combination to detect that the user is unauthorized. For example, a user can access a resource or service with two separate devices. If the authentication component 728 detects that the predictive applications differ between the two separate devices, the authentication component 728 can block access to the resource or service, generate an alert or warning, and the like. In some examples, the alert or warning can be transmitted to a verified email address or external device.

It is to be understood that the block diagram of FIG. 8 is not intended to indicate that the method 800 is to include all of the blocks shown in FIG. 8. Rather, the method 800 can include fewer or additional blocks not illustrated in FIG. 8. For example, method 800 can also include adding an advertising identifier to a malicious list for untrusted advertising identifiers or a trusted list for authenticated advertising identifiers. For example, the method 800 can include adding advertising identifiers that are determined to have a similarity below a threshold to a trusted list. In some embodiments, the method 800 can include determining that two predictive applications associated with advertising identifiers are not similar. The method 800 can also include detecting that a first advertising identifier of the two advertising identifiers is included in a trusted list of advertising identifiers. The method 800 can further include identifying the second advertising identifier as an unauthorized advertising identifier in response to detecting that the second advertising identifier is not included in the trusted list. The method 800 can then add the unauthorized advertising identifier to a malicious list of untrusted advertising identifiers. In some embodiments, the method 800 can include requesting two factor authentication of any user associated with an advertising identifier in the malicious list.

In some embodiments, the method 800 can also include generating a reputation score for each advertising identifier. For example, the reputation score can be any suitable number value, such as a value between zero and one, or any other range. The reputation score can be calculated based on previous unauthorized attempts to access data, and the like. In some examples, the method 800 can include requesting two factor authentication for advertising identifiers with a reputation score that is below a predetermined value.

Figure 9:
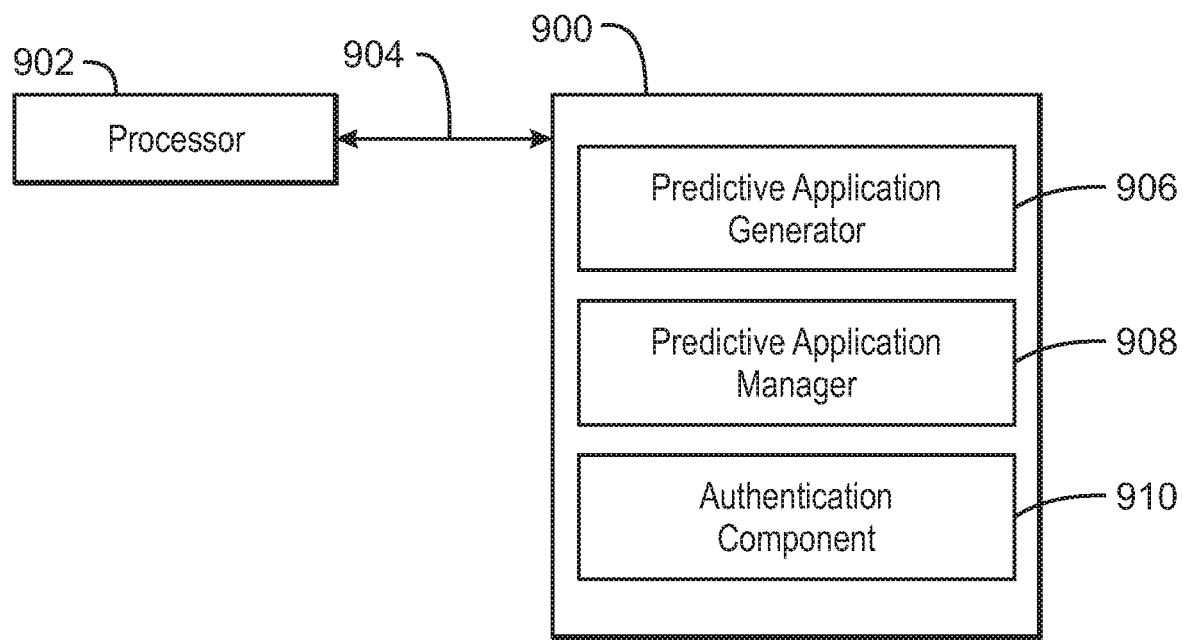
FIG. 9 is a block diagram of an example of a tangible, non-transitory computer-readable medium that can authenticate users.

Referring now to FIG. 9, a block diagram is depicted of an example of a tangible, non-transitory computer-readable medium that can authenticate users. The tangible, non-transitory, computer-readable medium 900 may be accessed by a processor 902 over a computer interconnect 904.

Furthermore, the tangible, non-transitory, computer-readable medium 900 may include code to direct the processor 902 to perform the operations of the current method. For example, a predictive application generator 906 can train a first predictive application based on a first set of user engagements with advertisements, wherein the first predictive application is associated with a first advertising identifier. The predictive application generator 906 can also train a second predictive application based on a second set of user engagements with the advertisements, wherein the second predictive application is associated with a second advertising identifier. Furthermore, a predictive application manager 908 can compare the first predictive application and the second predictive application. Moreover, an authentication component 910 can authenticate a user in response to detecting a similarity of the first predictive application and the second predictive application is below a threshold value, wherein authenticating the user enables the user to access a resource or service.

It is to be understood that any number of additional software components not shown in FIG. 9 may be included within the tangible, non-transitory, computer-readable medium 900, depending on the specific application. Furthermore, fewer software components than those shown in FIG. 9 can be included in the tangible, non-transitory, computer-readable medium 900.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system of authenticating users comprising:
   a processor configured to:
   train, in response to a generation of a first advertising identifier, a first predictive neural network on a first computing device based on a first set of user interactions with a first plurality of advertisements on a display of the first computing device, wherein the first set of user interactions are represented by a first set of binary numbers corresponding to a time that a user viewed each of the first plurality of advertisements, a vertical and horizontal location for each of the first plurality of advertisements on the display, an indication that the user selected a link corresponding to each of the first plurality of advertisements, and an indication that the user closed each of the first plurality of advertisements;
   generate a first feature vector via the trained first predictive neural network based on an input comprising of a first advertisement;
   send the first feature vector to an authentication server, wherein the authentication server is configured to receive the first feature vector and a second feature vector and calculate a distance metric based on the first feature vector and the second feature vector, wherein the distance metric comprises a Euclidean distance, a Manhattan distance, a Minkowski distance, a cosine distance, or a Jaccard distance, wherein the second feature vector is from a second predictive neural network trained on a second computing device, wherein the second feature vector is trained based on a second set of user interactions with a second plurality of advertisements on a display of the second computing device, and wherein the second set of user interactions are represented by a second set of binary numbers corresponding to a time that a user viewed each of the second plurality of advertisements, a vertical and horizontal location for each of the second plurality of advertisements on the display, an indication that the user selected a link corresponding to each of the second plurality of advertisements, and an indication that the user closed each of the second plurality of advertisements, and wherein the second predictive neural network is associated with a second advertising identifier, and wherein the second feature vector is generated by the second predictive neural network based on the input comprising of the first advertisement; and
   authenticate the user on the first computing device in response to receiving a detection of the calculated distance metric being below a threshold value to allow the user to access a resource or service, or block the user on the first computing device in response to receiving a detection of the calculated distance metric exceeding the threshold value to prevent the user from accessing the resource or service on the first computing device.

2. The system of claim 1, wherein authenticating the user based on the calculated distance metric between the first feature vector and the second feature vector is a complementary authentication technique, and wherein the processor is to combine the calculated distance metric with a username and password combination to detect that the user is unauthorized.

3. The system of claim 1, wherein the first predictive neural network is trained in response to the first predictive neural network being deleted.

4. A method for authenticating users comprising:
   training, via a processor on a first computing device, in response to a generation of a first advertising identifier, a first predictive neural network on the first computing device based on a first set of user interactions with a first plurality of advertisements on a display of the first computing device, wherein the first set of user interactions are represented by a first set of binary numbers corresponding to a time that a user viewed each of the first plurality of advertisements, a vertical and horizontal location for each of the first plurality of advertisements on the display, an indication that the user selected a link corresponding to each of the first plurality of advertisements, and an indication that the user closed each of the first plurality of advertisements;
   generate, via the processor, a first feature vector via the trained first predictive neural network based on an input comprising of a first advertisement;
   sending, via the processor, the first feature vector to an authentication server, wherein the authentication server is configured to receive the first feature vector and a second feature vector and calculate a distance metric based on the first feature vector and the second feature vector, wherein the distance metric comprises a Euclidean distance, a Manhattan distance, a Minkowski distance, a cosine distance, or a Jaccard distance, wherein the second feature vector is from a second predictive neural network trained on a second computing device, wherein the second feature vector is trained based on a second set of user interactions with a second plurality of advertisements on a display of the second computing device, and wherein the second set of user interactions are represented by a second set of binary numbers corresponding to a time that a user viewed each of the second plurality of advertisements, a vertical and horizontal location for each of the second plurality of advertisements on the display, an indication that the user selected a link corresponding to each of the second plurality of advertisements, and an indication that the user closed each of the second plurality of advertisements, and wherein the second predictive neural network is associated with a second advertising identifier, and wherein the second feature vector is generated by the second predictive neural network based on the input comprising of the first advertisement; and authenticating, via the processor, the user on the first computing device in response to receiving a detection of the calculated distance metric being below a threshold value to allow the user to access a resource or service, or block the user on the first computing device in response to receiving a detection of the calculated distance metric exceeding the threshold value to prevent the user from accessing the resource or service on the first computing device.

5. A computer program product for authenticating users, the computer program product comprising a computer readable storage medium having program instructions embodied therewith, wherein the computer readable storage medium is not a transitory signal per se, the program instructions, when executed by a processor, cause the processor to:

train, in response to a generation of a first advertising identifier, a first predictive neural network on a first computing device based on a first set of user interactions with a first plurality of advertisements on a display of the first computing device, wherein the first set of user interactions are represented by a first set of binary numbers corresponding to a time that a user viewed each of the first plurality of advertisements, a vertical and horizontal location for each of the first plurality of advertisements on the display, an indication that the user selected a link corresponding to each of the first plurality of advertisements, and an indication that the user closed each of the first plurality of advertisements;

generate a first feature vector via the trained first predictive neural network based on an input comprising of a first advertisement;

send the first feature vector to an authentication server, wherein the authentication server is configured to receive the first feature vector and a second feature vector and calculate a distance metric based on the first feature vector and the second feature vector, wherein the distance metric comprises a Euclidean distance, a Manhattan distance, a Minkowski distance, a cosine distance, or a Jaccard distance, wherein the second feature vector is from a second predictive neural network trained on a second computing device, wherein the second feature vector is trained based on a second set of user interactions with a second plurality of advertisements on a display of the second computing device, and wherein the second set of user interactions are represented by a second set of binary numbers corresponding to a time that a user viewed each of the second plurality of advertisements, a vertical and horizontal location for each of the second plurality of advertisements on the display, an indication that the user selected a link corresponding to each of the second plurality of advertisements, and an indication that the user closed each of the second plurality of advertisements, and wherein the second predictive neural network is associated with a second advertising identifier, and wherein the second feature vector is generated by the second predictive neural network based on the input comprising of the first advertisement; and authenticate the user on the first computing device in response to receiving a detection of the calculated distance metric being below a threshold value to allow the user to access a resource or service, or block the user on the first computing device in response to receiving a detection of the calculated distance metric exceeding the threshold value to prevent the user from accessing the resource or service on the first computing device.

* * * * *